(12) United States Patent
Lin et al.

(10) Patent No.: US 10,330,528 B2
(45) Date of Patent: Jun. 25, 2019

(54) OPTICAL ASSEMBLY POSITION ADJUSTMENT DEVICE

(71) Applicant: NIEN-YI INDUSTRIAL CORPORATION, Taipei (TW)

(72) Inventors: Tung-Lou Lin, Hsinchu County (TW); Hsin-Ni Lee, Hsinchu County (TW)

(73) Assignee: NIEN-YI INDUSTRIAL CORPORATION, Taipei (TW)

(*) Notice: Subject to any disclaimer, the term of this patent is extended or adjusted under 35 U.S.C. 154(b) by 79 days.

(21) Appl. No.: 15/680,149

(22) Filed: Aug. 17, 2017

(65) Prior Publication Data

US 2018/0052044 A1 Feb. 22, 2018

(30) Foreign Application Priority Data

Aug. 22, 2016 (TW) .............................. 105126698 A

(51) Int. Cl.
  *G01J 1/04* (2006.01)
  *G01J 1/02* (2006.01)
  *G02B 6/42* (2006.01)
  *G01J 1/32* (2006.01)

(52) U.S. Cl.
  CPC ........... *G01J 1/0448* (2013.01); *G01J 1/0271* (2013.01); *G01J 1/0411* (2013.01); *G01J 1/0414* (2013.01); *G01J 1/32* (2013.01); *G02B 6/423* (2013.01); *G02B 6/4262* (2013.01)

(58) Field of Classification Search
  CPC ...... G01J 1/0271; G01J 1/0411; G01J 1/0214; G01J 2001/4466
  See application file for complete search history.

(56) References Cited

U.S. PATENT DOCUMENTS 7,266,139 B2 * 9/2007 Haneda ................ G02B 6/4204
                                                    257/E31.128
8,950,951 B2    2/2015 Lin
9,625,655 B1    4/2017 Zhu et al.

* cited by examiner

*Primary Examiner* — Tony Ko
(74) *Attorney, Agent, or Firm* — Leong C. Lei

(57) ABSTRACT

The present disclosure includes an optical assembly position adjustment device. An embodiment of the optical assembly position adjustment device includes a base and at least one housing. The base includes an upper side and a lateral side. The upper side allows the setting of at least one optoelectronic device, and the lateral includes a first position adjustment structure. The at least one housing includes an interior side including a second position adjustment structure. The second position adjustment structure matches the first position adjustment structure for combination. In addition, the at least one housing includes an optical input/output window for optical transmission. The distance between the optical input/output window and the upper side can be adjusted by the increase or decrease of a contact area between the first and second position adjustment structures.

20 Claims, 9 Drawing Sheets

US 10,330,528 B2

OPTICAL ASSEMBLY POSITION ADJUSTMENT DEVICE

BACKGROUND OF THE INVENTION

1. Field of the Invention

The present invention relates to an optical device, especially to an optical assembly position adjustment device.

2. Description of Related Art

In recent years, as the demand for data throughput and transmission speed goes up, the traditional way using copper cables as the medium of data transmission is gradually out of date; therefore fiber transmission has taken the place of copper transmission to be the major means for high speed transmission, particularly long-distance transmission.

As the development of technology, the transmission speed of a commercial optical transceiver has reached hundreds of GHz (gigabit/s). Such high speed optical transceiver should be made with great precision of assembly position and focus alignment. In consideration of a device part is usually built to a certain tolerance, a fine tune process is often required; therefore, techniques to adjust assembly position and focus are required. However, in current arts, both active alignment techniques and passive alignment techniques are hard to precisely adjust assembly position and focus in a cost-effective way. As a result, this industrial field should choose to improve optical coupling efficiency with the increase of assembly cost, or choose to sacrifice optical coupling efficiency for the reduction of cost.

Besides, the current active alignment techniques have many disadvantages such as taking a lot of time to adjust an optical axis, requiring numerous and complicated optical assemblies, low design tolerance, and being vulnerable to heat, shake, deterioration of adhesive, and shock. In order to solve these disadvantages, production cost may greatly increase. On the other hand, a passive alignment technique is better for the control of cost, and a better passive alignment technique is found in Applicant's U.S. patent application "OPTICAL SUB-ASSEMBLY AND PACKAGING METHOD THEREOF" (application Ser. No. 14/076,996).

SUMMARY OF THE INVENTION

An object of the present invention is to provide an optical assembly position adjustment device for making improvements over the prior arts.

The present disclosure includes an optical assembly position adjustment device. An embodiment of the optical assembly position adjustment device includes a base and at least one housing. The base includes an upper side and a lateral side. The upper side allows the setting of at least one optoelectronic device, and the lateral includes a first position adjustment structure including a first non-smooth face. The at least one housing includes an interior side including a second position adjustment structure. The second position adjustment structure includes a second non-smooth face, so that the second position adjustment structure matches the first position adjustment structure. In addition, the at least one housing includes an optical input/output window for optical transmission. The distance between the optical input/output window and the upper side can be adjusted by the increase or decrease of a contact area between the first position adjustment structure and the second position adjustment structure.

In comparison with the prior arts, the techniques of the present disclosure precisely adjusts assembly position in a cost-effective way, finely adjusts the focus and optical spot in demand, has wider design tolerance, and is resistant to heat, shake or shock.

These and other objectives of the present invention will no doubt become obvious to those of ordinary skill in the art after reading the following detailed description of the embodiments that are illustrated in the various figures and drawings.

DETAILED DESCRIPTION OF THE PREFERRED EMBODIMENTS

Figure 1:
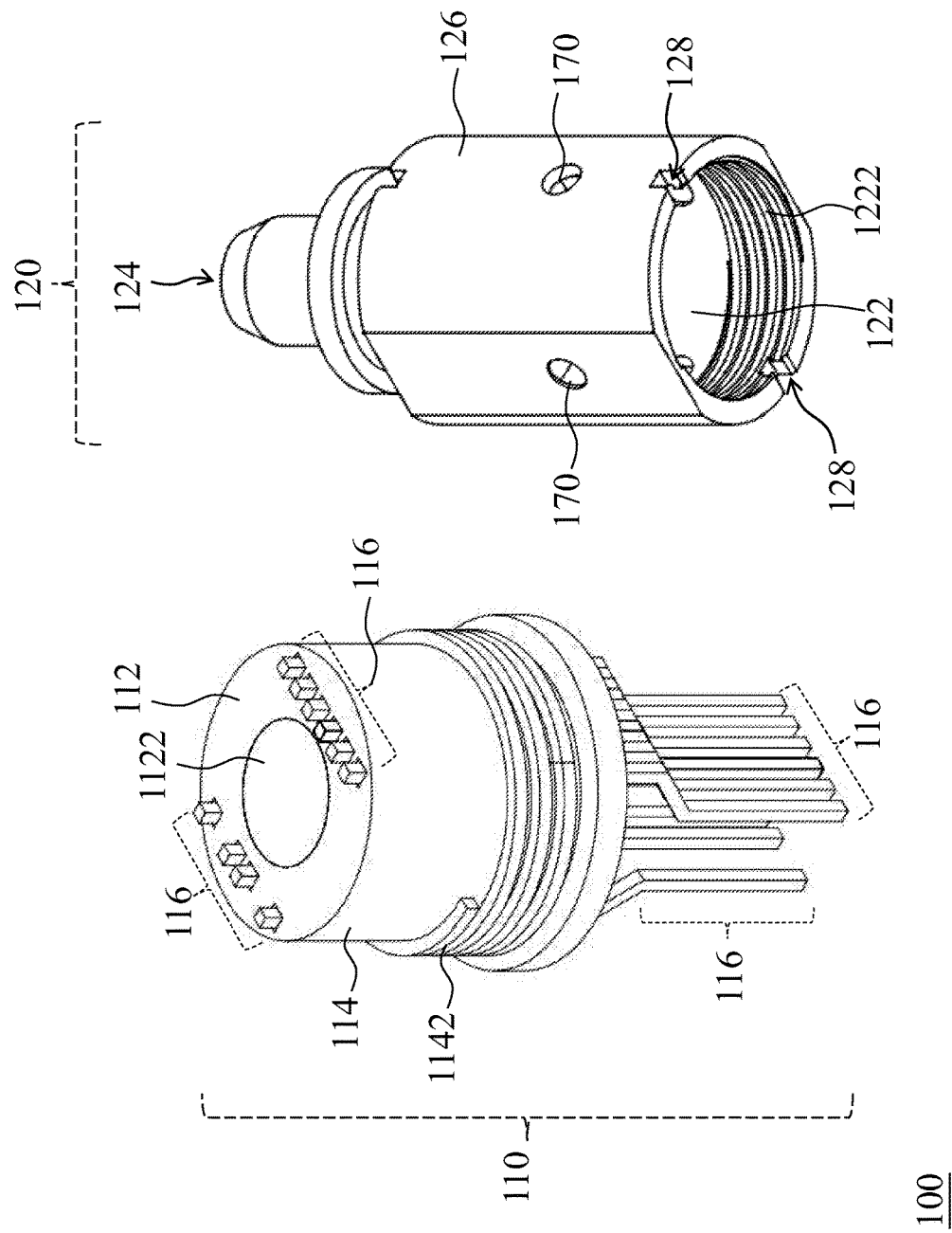
FIG. 1 illustrates an embodiment of the optical assembly position adjustment device according to the present invention.

A plurality of embodiments are described in the following paragraphs. For better understanding, details about practical implementations might be mentioned in these embodiments. However, these details should not be restrictions on implementations of the present invention; in other words, for at least some of the embodiments, some or all of the details are unnecessary, alterable, or replaceable. Besides, some disclosed drawing might be simplified as some well-known structure and/or element in the drawing are simplified; furthermore, the shape, size, and scale of any structure or element in the disclosed drawings are just exemplary for understanding, not for limiting the scope of the present invention.

In the following description, each embodiment includes one or more features; however, this doesn't mean that one carrying out the present invention should make use of all the features of one embodiment at the same time, or should only carry out different embodiments separately. In other words, if an implementation derived from one or more of the embodiments is practicable, a person of ordinary skill in the art can selectively make use of some or all of the features in one embodiment or selectively make use of the combination of some or all features in several embodiments to have the implementation come true, so as to achieve the flexibility of carrying out the present invention.

The terms "first", "second", etc., in this specification are not ordinal numbers, rankings, and functional wordings; these terms are merely used for distinguishing similar elements, actions, etc.

Figure 2:
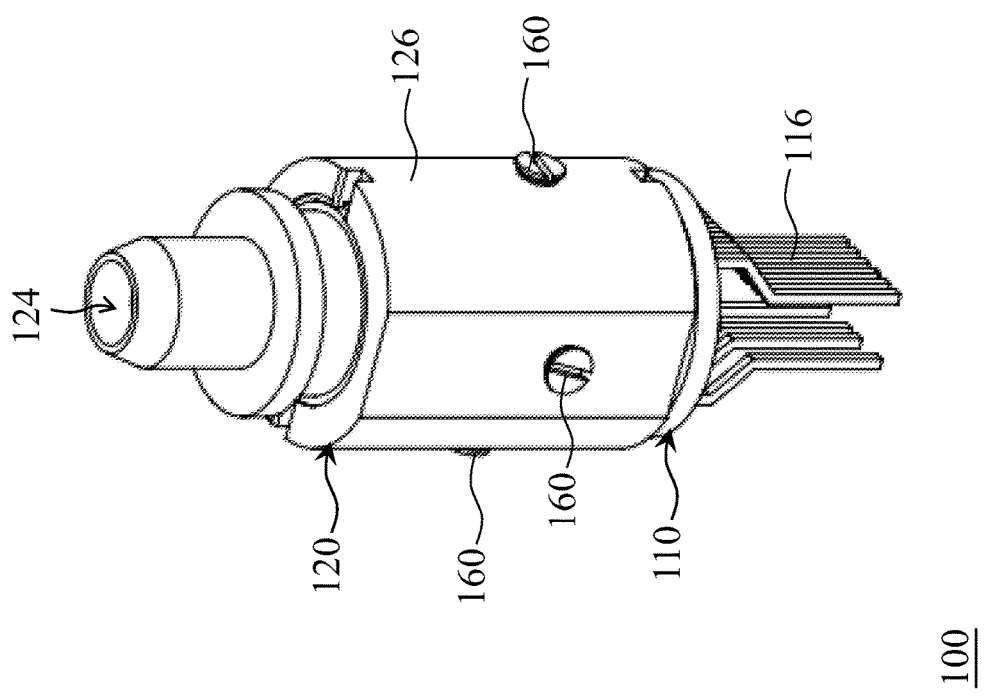
FIG. 2 shows the optical assembly position adjustment device of FIG. 1 after its base and housing are assembled together.
Figure 4:
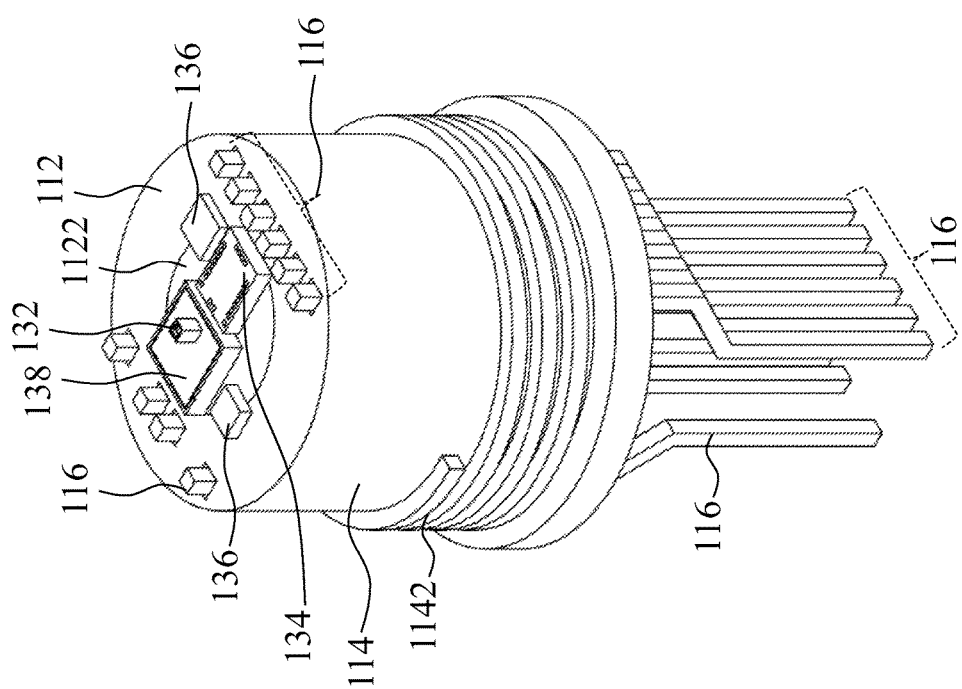
FIG. 4 illustrates an embodiment of the at least one optoelectronic device on the base of FIG. 1.
Figure 5:
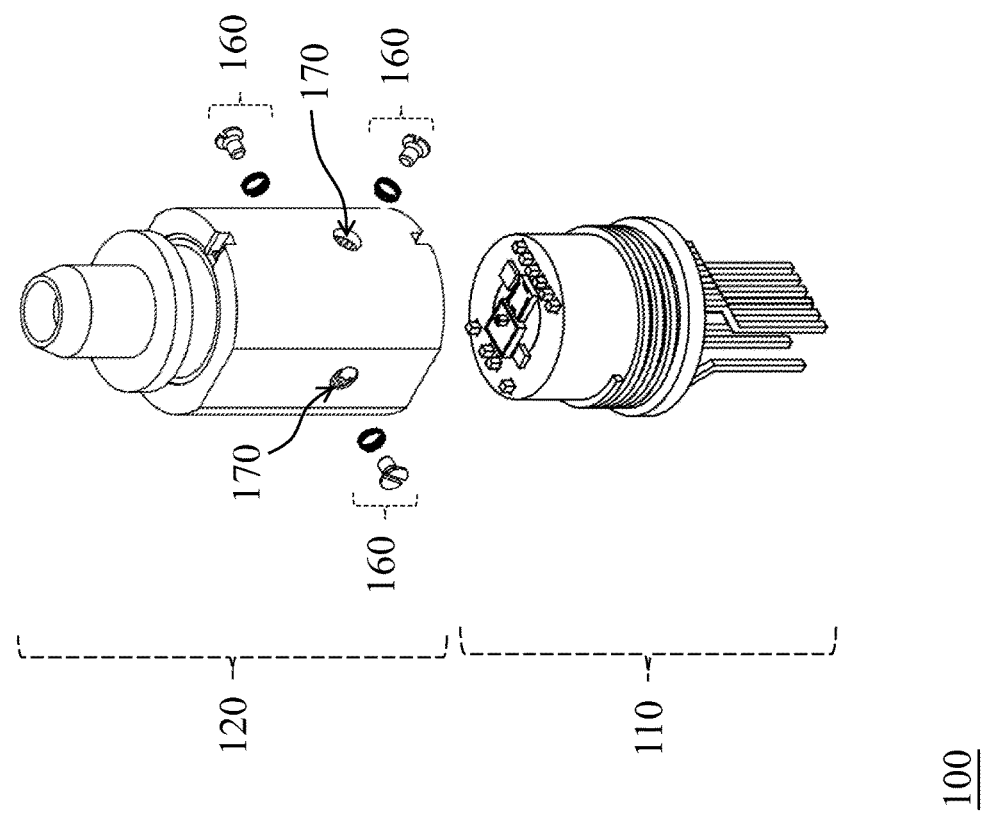
FIG. 5 shows how to adjust the position of the base of FIG. 1.

Please refer to FIG. 1 which illustrates an embodiment of the optical assembly position adjustment device according to the present invention. As shown in FIG. 1, the optical assembly position adjustment device 100 includes a base 110 and at least a housing 120 which can be assembled as shown in FIG. 2. The base 110 includes an upper side 112 and a lateral side 114. The upper side 112 includes an optoelectronic device setting area 1122 for the setting of at least one optoelectronic device (as shown in FIG. 4). The optoelectronic device setting area 1122 could be made of heat-sink material such as metal, carbon material, etc., or made of the material the same as the main material (e.g., plastic material) of the other part of the base 110. The at least one optoelectronic device is included in or independent of the optical assembly position adjustment device 100; in other words, the at least one optoelectronic device is or is not a part of the optical assembly position adjustment device 100. An embodiment of the at least one optoelectronic device includes a light emitter (e.g., a Vertical Cavity Surface Emitting Laser (VCSEL) or a light emitter that is known or self-developed) and/or a light receiver, and is coupled to a signal processing circuit through the leads 116 and an electric connection manner such as wire bonding or printed wiring, so that the at least one optoelectronic device is operable to receive an electric signal from the signal processing circuit and thereby generate an optical signal, and/or operable to receive an optical signal and thereby output an electric signal to the signal processing circuit. The said leads 116 are or are not included in the base 110. The lateral side 114 includes a first position adjustment structure 1142. In this embodiment, the first position adjustment structure 1142 is a screw thread structure (while in another embodiment the first position adjustment structure 1142 is a stepped engagement structure); however, this is just an example rather than a limitation to the scope of the present invention. In other embodiments, another kind of step-less structure or a multi-step structure is used to realize the first position adjustment structure 1142. An example of the said multi-step structure is a structure including multiple guiding slots/tracks in the form of ladder (e.g., ⌐ ).

Figure 3:
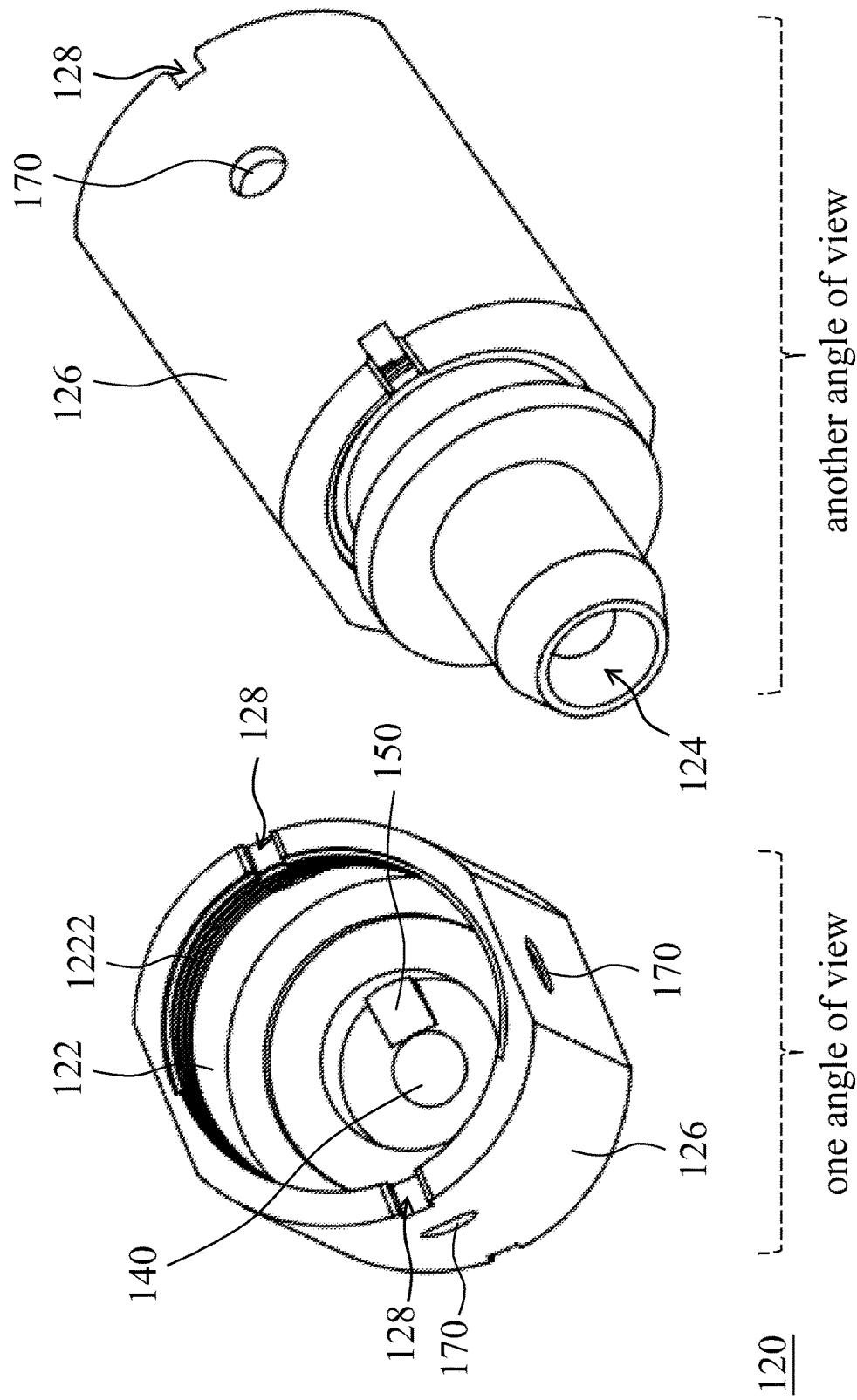
FIG. 3 shows the at least one housing of FIG. 1 by different angles of view.

Please refer to FIGS. 1~3. The at least one housing 120 includes an interior side 122, an optical input/output window 124 and a lateral side 126. The interior side 122 includes a second position adjustment structure 1222 which matches the first position adjustment structure 1142. In this embodiment, the second position adjustment structure 1222 is a screw thread structure (while in another embodiment the second position adjustment structure 1222 is a stepped engagement structure); however, this is just an example, not a limitation to the scope of the present invention. In other embodiments, another kind of step-less structure or a multi-step structure is used to realize the second position adjustment structure 1222. An example of the said multi-step structure is a structure including a guided convex/concave (e.g., a convex/concave structurally corresponding to the aforementioned guiding slots/tracks). The optical input/output window 124 is for optical transmission which transmits an optical signal from the aforementioned at least one optoelectronic device to at least one optical fiber and/or transmits an optical signal from the at least one optical fiber to the at least one optoelectronic device, in which a terminal of the at least one optical fiber could be positioned in, on or above the at least one housing 120. When the optical fiber is positioned in the at least one housing 120, a lens 140 could be optionally set in the at least one housing 120 for the enhancement of optical coupling, in which the lens 140 such as a spherical/aspherical lens is optionally in alignment with the optical input/output window 124. When the optical fiber is positioned outside the at least one housing 120, the lens 140 could be optionally set in, on or above the at least one housing 120 for the enhancement of optical coupling; similarly, the lens 140 is optionally in alignment with the optical input/output window 124. It should be noted that the lens 140 is or is not included in the optical assembly position adjustment device 100. In addition, a distance between the optical input/output window 124 and the upper side 112, which is substantially equivalent to a distance between the window 124/the lens 140 and the upper side 112/the at least one optoelectronic device, can be adjusted by the increase or decrease of a contact area between the second position adjustment structure 1222 and the first position adjustment structure 1142. For instance, when the contact area between the second position adjustment structure 1222 (e.g., a screw thread structure) and the first position adjustment structure 1142 (e.g., a screw thread structure) is increased, the distance between the optical input/output window 124 and the upper side 112 is decreased; on the other hand, when the contact area is decreased, the distance is increased.

Please refer to FIGS. 1~4, the at least one optoelectronic device includes a light emitter and/or a light receiver, and optionally includes a driver and/or an amplifier. When the at least one optoelectronic device includes a light emitter 132, a driver 134 for driving the light emitter 132, and a plurality of pad materials 136 for electric coupling and/or heat-dissipation of the light emitter 132 and the driver 134, in order to detect whether the light emission efficiency of the light emitter 132 fills expectation, a reflector 150 is set in the at least one housing 120 to reflect the light from the light emitter 132, a light detector 138 included in the at least one optoelectronic device generates a detection result by detecting a reflection from the reflector 150, and the aforementioned signal processing circuit or an analyzing circuit (e.g., a circuit included in the light detector 138) analyzes the detection result to determine whether the light emission efficiency of the light emitter 132 achieves a predetermined threshold. For instance, the light detector 138 includes a photosensitive resistor, and the analyzing circuit includes a voltage and/or current detector operable to detect the voltage and/or current variation of the photosensitive resistor, so that whether the light emission efficiency of the light emitter 132 achieves a predetermined threshold can be determined according to the voltage and/or current variation and then the light emitter 132 can be adjusted accordingly. It should be noted that the reflector 150 is included in or independent of the optical assembly position adjustment device 100.

Please refer to FIGS. 1~4 again. In order to make compensation when the output of the light emitter 132 is out of expectation, the aforementioned signal processing circuit or the analyzing circuit further includes a compensation function. Such compensation function is for adjusting the light emitter 132 according to the aforementioned detection result. For instance, the compensation function is an optical attenuation compensation function for adjusting parameters of the light emitter 132 and/or the driver 134 or adjusting other parameters about light emission effect when the detection result indicates that the output light of the light emitter 132 is below expectation, so as to increase the intensity of the output light of the light emitter 132.

Please refer to FIGS. 1~5. In order to adjust the position of the base 110 in a first direction, that is to say the position of the at least one optoelectronic device on the base 110 in the first direction, for the enhancement of optical coupling, the optical assembly position adjustment device 100 includes at least one positioning element 160 which corresponds to at least one positioning hole 170 included in the at least one housing 120. The at least one positioning hole 170 exposes at least a part of the base 110, so that the at least one positioning element 160 is able to contact (e.g., push or press) the base 110 through the at least one positioning hole 170. As a result, a position of the base 110 in a first direction can be adjusted by an extent of the at least one positioning element 160 contacting the base 110. For instance, the at least one positioning element 160 is composed of four elements 160 which correspond to four positioning holes 170 at the front, back, left and right positions of the at least one housing 120. At least one of the four positioning elements 160 has a flexible structure such as a combination of a spring (or a pad) and a screw, and the positioning hole 170 corresponding to the positioning element 160 having the flexible structure is a screw hole, so that the screw of the positioning element 160 can be tightened to the screw hole (i.e., the positioning hole 170) after the spring (or the pad) of the positioning element 160 is put in the screw hole; therefore the screw of the positioning element 160 can exert force on the spring/pad to push or press the base 110. The more the exerted force, the further the movement of the base 110 in the first direction. The first direction could be defined by a shortest path between the front and the back positioning holes 170 (or between the left and the right positioning holes 170). Generally, the first direction is perpendicular to a normal direction of the upper side 112; however, this is just an example rather than a limitation. Since those of ordinary skill in the art can appreciate how to adjust the position of the base 110 in the other directions by the arrangement of the other positioning hole(s) 170 and the usage of the other positioning element(s) 160, repeated and redundant description is omitted. It should be noted that if the position of the base 110 in the first direction has no need to be adjusted, the said positioning element(s) 160 and the positioning hole(s) 170 for position adjustment in the first direction are no longer necessary.

The aforementioned at least one housing 120 could be fixed to the base 110 with a photosensitive adhesive (e.g., ultraviolet (UV) adhesive), a heat-sensitive adhesive (e.g., epoxy adhesive), or any appropriate adhesive for fixation. When the at least one housing 120 is fixed to the base 110 with a photosensitive adhesive, at least a part of the at least one housing 120 is transmittable (i.e., light-permeable or translucent), so that the photosensitive adhesive can be cured by external radiation through the transmittable part. Besides, the at least one housing 120 may include one or more adhesive injection opening(s) 128 or the like, so that the adhesive for fixation can be injected into the one or more adhesive injection opening(s) 128 after the position relation between the housing 120 and the base 110 is determined. Please note that other known or self-developed fixation means could be used instead of the said adhesive. Please also note that the adhesive may be spread onto the first position adjustment structure 1142 of the base 110 and/or the second position adjustment structure 1222 of the at least one housing 120 in advance; in this case, the adhesive injection opening(s) 128 could be optionally omitted.

Figure 6:
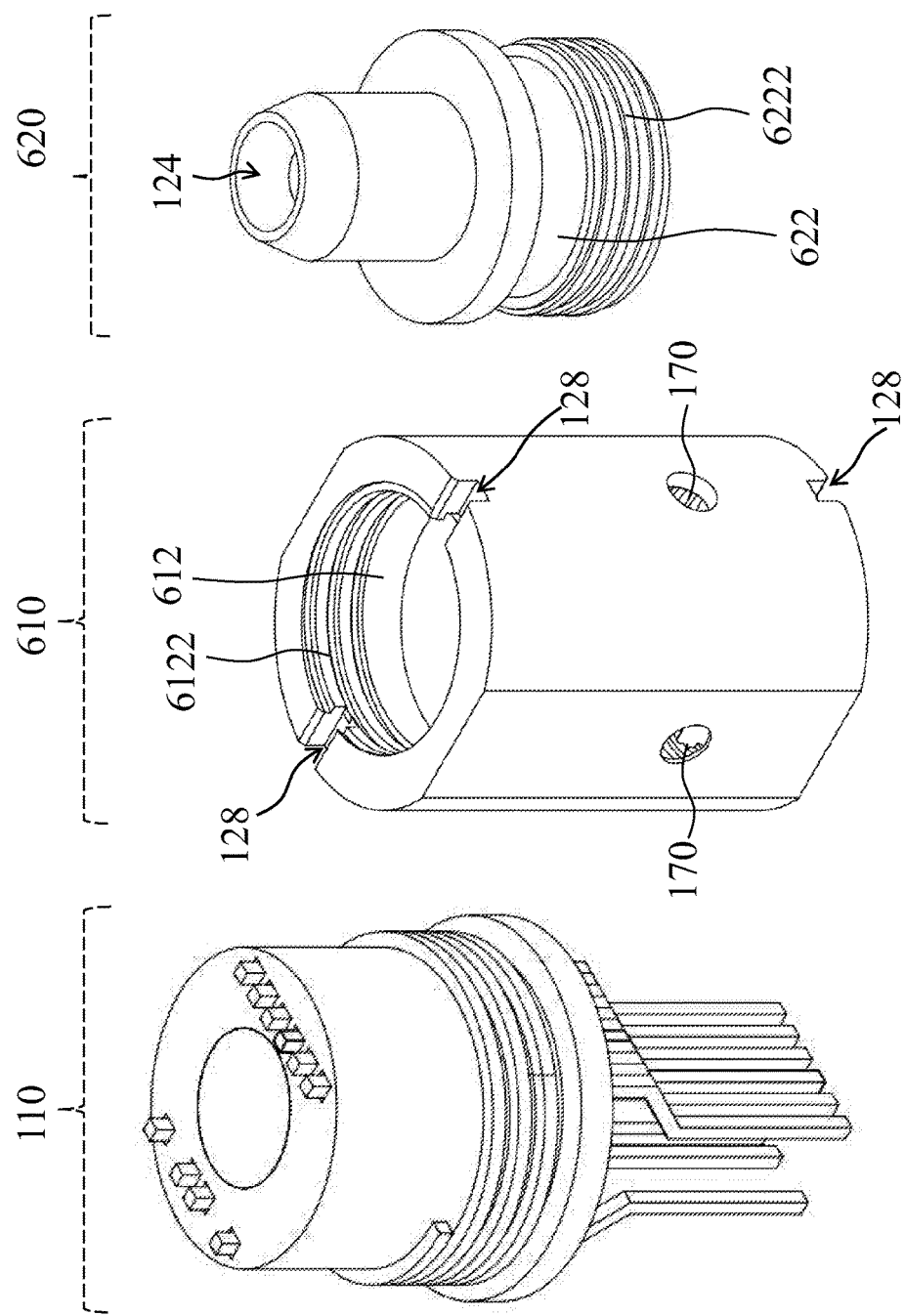
FIG. 6 illustrates another embodiment of the optical assembly position adjustment device according to the present invention.
Figure 7:
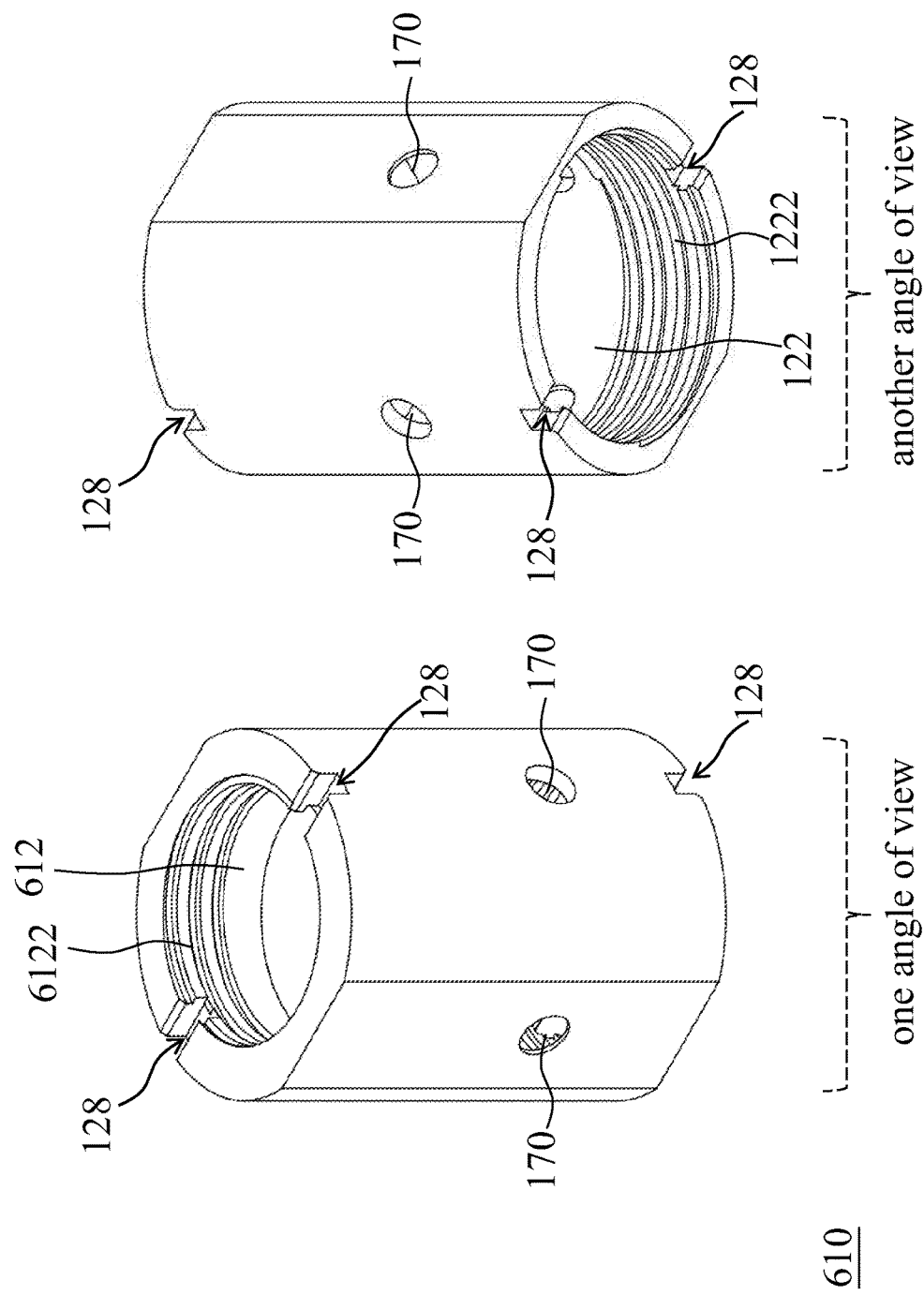
FIG. 7 shows the first housing of FIG. 6 by different angles of view.
Figure 8:
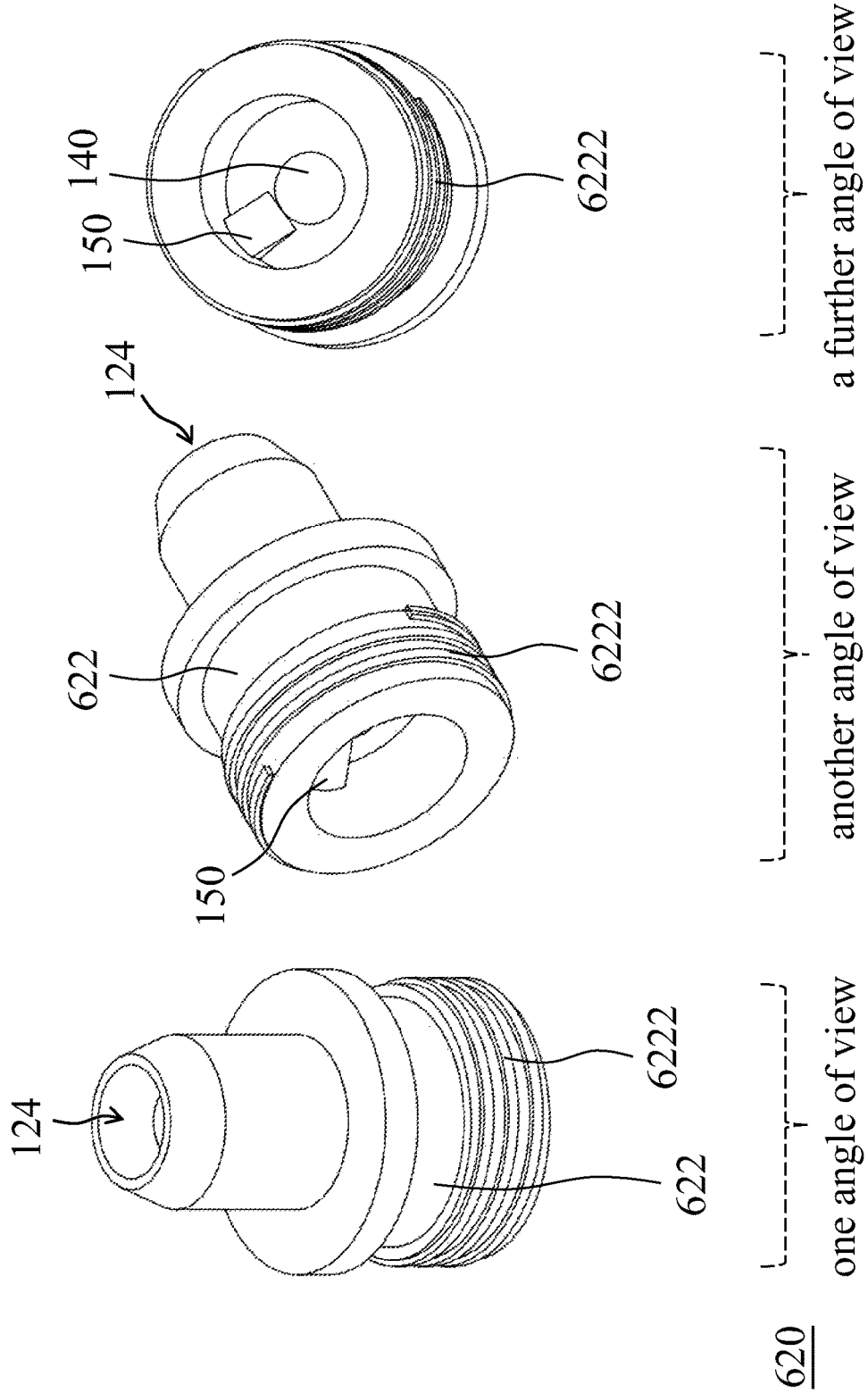
FIG. 8 shows the second housing of FIG. 6 by different angles of view.
Figure 9:
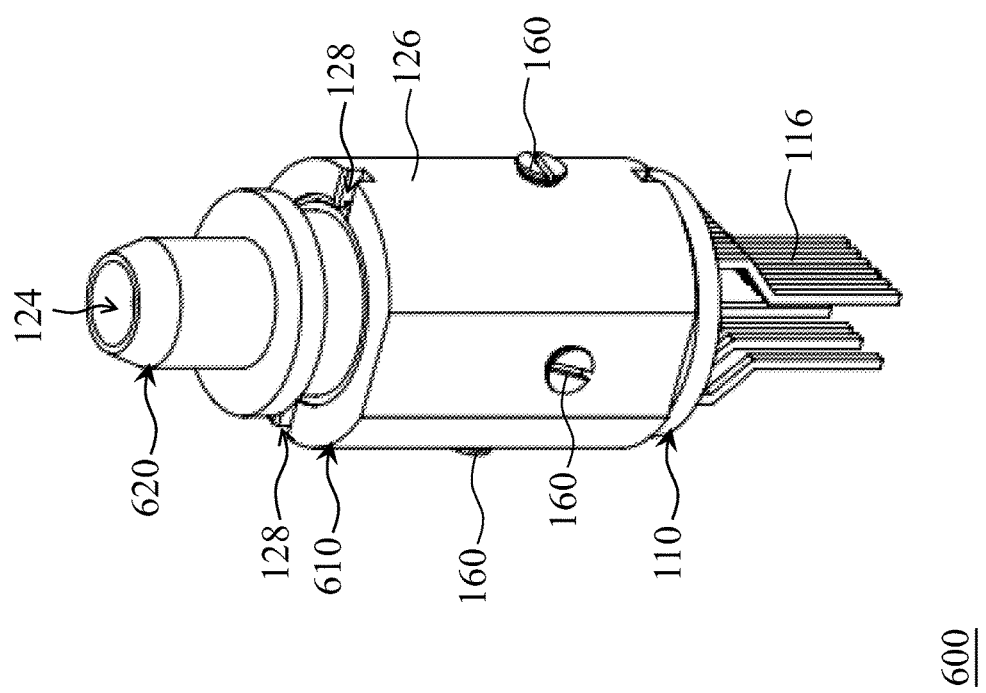
FIG. 9 shows the optical assembly position adjustment device of FIG. 6 after its base and housing are assembled together.

Please refer to FIG. 6 which illustrates another embodiment of the optical assembly position adjustment device according to the present invention. Compared with FIG. 1, the at least one housing of the optical assembly position adjustment device 600 in FIG. 6 includes a first housing 610 and a second housing 620. FIG. 7 and FIG. 8 respectively show the first housing 610 and the second housing 620 by different angles of view, and FIG. 9 shows the optical assembly position adjustment device 600 after its base 110 and housing 610,620 are assembled together. As shown in FIGS. 6~9, the first housing 610 includes the aforementioned interior side 122, the second position adjustment structure 1222, the adhesive injection opening(s) 128 and the positioning hole(s) 170, and further includes a first contact side 612 including a third position adjustment structure 6122. The second housing 620 includes the aforementioned optical input/output window 124; the aforementioned lens 140 is set in, on or above the second housing 620 and optionally in alignment with the optical input/output window 124; the aforementioned reflector 150 is optionally set in the second housing 620, if necessary; and the second housing 620 further includes a second contact side 622 including a fourth position adjustment structure 6222. The fourth position adjustment structure 6222 matches the third position adjustment structure 6122, so that the distance between the optical input/output window 124 and the upper side 112, which is substantially equivalent to the distance between the window 124/the lens 140 and the upper side 112/the at least one optoelectronic device, is operable to be adjusted by the increase or decrease of a contact area between the fourth position adjustment structure 6222 and the third position adjustment structure 6122.

Please refer to FIGS. 6~9 again. In an exemplary implementation of this embodiment, the third position adjustment structure 6122 and the fourth position adjustment structure 6222 are two matching screw thread structures (while in another embodiment the third position adjustment structure 6122 and the fourth position adjustment structure 6222 are two matching stepped engagement structures); however, this is exemplary rather than limitative for the implementation of the present invention, and another kind of step-less design or a multi-step design (e.g., the aforementioned structure with the guiding slots/tracks and the structure with the convex/concave) can be used to realize the third position adjustment structure 6122 and the fourth position adjustment structure 6222. In an exemplary implementation of this embodiment, the first housing 610 is made of metal, so as to play a shield to prevent electromagnetic interference (EMI). In an exemplary implementation of this embodiment, the optical assembly position adjustment device 600 includes the aforementioned at least one positioning element 160, the first housing 6122 includes the aforementioned at least one positioning hole 170 which exposes at least a part of the base 110, and the at least one positioning element 160 contacts the base 110 through the at least one positioning hole 170, so that the position of the base 110 in a first direction can be adjusted by an extent of the at least one positioning element 160 contacting (e.g., pushing or pressing) the base 110. In an exemplary implementation of this embodiment, the first housing 610 is fixed to the second housing 620 with a photosensitive adhesive or a heat-sensitive adhesive; when the first housing 610 is fixed to the second housing 620 with a photosensitive adhesive, at least a part of the outer one of the first housing 610 and the second housing 620 is transmittable (i.e., light-permeable or translucent), so that the photosensitive adhesive can be cured by external radiation through the transmittable part. In this exemplary implementation, the second housing 620 instead of the first housing 610 is the outer one, so that the second housing 620 will cover at least a part of the first housing 610 when they are assembled together; however, those of ordinary skill in the art will appreciate how to make the first housing 610 be the outer one by appropriate modification.

Since those of ordinary skill in the art can appreciate the detail and alteration of the embodiments of FIGS. 6~9 by referring to the embodiments of FIGS. 1~5, which means that the features of the embodiments of FIGS. 1~5 can be applied to the embodiments of FIGS. 6~9 in a reasonable way, repeated and redundant explanation is omitted.

To sum up, the optical assembly position adjustment device of the present invention is capable of precisely adjusting the assembly position and focus in a cost-effective way, has wider design tolerance, and can resist the influence caused by the variation of environment.

The aforementioned descriptions represent merely the embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An optical assembly position adjustment device, comprising:
    a base including an upper side and a lateral side, in which the upper side allows setting of at least one optoelectronic device, and the lateral side includes a first position adjustment structure having a first non-smooth face; and
    at least one housing including an interior side, in which the interior side includes a second position adjustment structure having a second non-smooth face so that the second position adjustment structure is operable to match the first position adjustment structure,
    wherein the at least one housing includes an optical input/output window for optical transmission, and a distance between the optical input/output window and the upper side is operable to be adjusted by increase or decrease of a contact area between the first position adjustment structure and the second position adjustment structure.

2. The optical assembly position adjustment device of claim 1, wherein a screw thread of the first position adjustment structure matches a screw thread of the second position adjustment structure.

3. The optical assembly position adjustment device of claim 1, further comprising a reflector which is set in the at least one housing, wherein the at least one optoelectronic device is set on the upper side and includes at least one light detector operable to generate a detection result by detecting a reflection from the reflector.

4. The optical assembly position adjustment device of claim 3, wherein the at least one optoelectronic device further includes a light emitter and a compensator, and the compensator is operable to adjust emitted light of the light emitter according to the detection result.

5. The optical assembly position adjustment device of claim 4, wherein the at least one housing includes:
    a first housing including the interior side and a first contact side, in which the first contact side includes a third position adjustment structure having a third non-smooth face; and
    a second housing including the optical input/output window while the reflector is set in the second housing, in which the second housing includes a second contact side including a fourth position adjustment structure, and the fourth position adjustment structure has a fourth non-smooth face so that the fourth position adjustment structure matches the third position adjustment structure,
    wherein the distance between the optical input/output window and the upper side is operable to be adjusted by increase or decrease of a contact area between the third position adjustment structure and the fourth position adjustment structure.

6. The optical assembly position adjustment device of claim 5, wherein a screw thread of the third position adjustment structure matches a screw thread of the fourth position adjustment structure.

7. The optical assembly position adjustment device of claim 5, wherein a screw thread of the first position adjustment structure matches a screw thread of the second position adjustment structure.

8. The optical assembly position adjustment device of claim 5, wherein the first housing is made of metal.

9. The optical assembly position adjustment device of claim 5, wherein the first housing includes at least one positioning hole exposing at least a part of the base, and the optical assembly position adjustment device further comprises at least one positioning element contacting the base through the at least one positioning hole so that a position of the base in a first direction is operable to be adjusted by an extent of the at least one positioning element contacting the base.

10. The optical assembly position adjustment device of claim 9, wherein at least one of the at least one positioning element has a flexible structure, and the first direction is perpendicular to a normal direction of the upper side.

11. The optical assembly position adjustment device of claim 1, wherein the at least one housing includes:
    a first housing including the interior side and a first contact side, in which the first contact side includes a third position adjustment structure having a third non-smooth face; and
    a second housing including the optical input/output window, in which the second housing includes a second contact side including a fourth position adjustment structure, and the fourth position adjustment structure has a fourth non-smooth face so that the fourth position adjustment structure matches the third position adjustment structure,
    wherein the distance between the optical input/output window and the upper side is operable to be adjusted by increase or decrease of a contact area between the third position adjustment structure and the fourth position adjustment structure.

12. The optical assembly position adjustment device of claim 11, wherein the first housing and the second housing are fixed together with a photosensitive adhesive or a heat-sensitive adhesive.

13. The optical assembly position adjustment device of claim 11, wherein a screw thread of the third position adjustment structure matches a screw thread of the fourth position adjustment structure.

14. The optical assembly position adjustment device of claim 11, wherein the first housing includes at least one positioning hole exposing at least a part of the base, and the optical assembly position adjustment device further comprises at least one positioning element contacting the base through the at least one positioning hole so that a position of the base in a first direction is operable to be adjusted by an extent of the at least one positioning element contacting the base.

15. The optical assembly position adjustment device of claim 14, wherein at least one of the at least one positioning element has a flexible structure.

16. The optical assembly position adjustment device of claim 14, wherein the first direction is perpendicular to a normal direction of the upper side.

17. The optical assembly position adjustment device of claim 1, further comprising a lens which is set in, on or above the at least one housing, in which the lens is in alignment with the optical input/output window.

18. The optical assembly position adjustment device of claim 1, wherein the at least one housing and the base are fixed together with a photosensitive adhesive or a heat-sensitive adhesive.

19. The optical assembly position adjustment device of claim 1, wherein the first housing includes at least one positioning hole exposing at least a part of the base, and the optical assembly position adjustment device further comprises at least one positioning element contacting the base through the at least one positioning hole so that a position of the base in a first direction is operable to be adjusted by an extent of the at least one positioning element contacting the base.

20. The optical assembly position adjustment device of claim 19, wherein at least one of the at least one positioning element has a flexible structure, and the first direction is perpendicular to a normal direction of the upper side.

* * * * *